United States Patent [19]
Robinson

[11] Patent Number: 5,969,753
[45] Date of Patent: Oct. 19, 1999

[54] METHOD AND SYSTEM FOR DETECTING ERRORS IN A SAMPLE IMAGE

[75] Inventor: David A. Robinson, Northants, United Kingdom

[73] Assignee: Medar, Inc., Farmington Hills, Mich.

[21] Appl. No.: 09/065,973

[22] Filed: Apr. 24, 1998

[51] Int. Cl.[6] .................................................... H04N 7/18
[52] U.S. Cl. ........................ 348/130; 348/92; 348/125; 348/129; 382/144; 382/170; 382/181; 382/209; 382/228
[58] Field of Search ................................ 348/86, 91–92, 348/125–130; 356/237; 382/170–171, 181, 209, 144, 168, 228; H04N 7/18

[56] References Cited

U.S. PATENT DOCUMENTS

| | | | |
|---|---|---|---|
| 4,429,414 | 1/1984 | Asakawa | 382/209 |
| 4,805,224 | 2/1989 | Koezuka et al. | 382/209 |
| 5,465,308 | 11/1995 | Hutcheson et al. | 382/159 |
| 5,537,670 | 7/1996 | Cox et al. | 348/130 |
| 5,640,200 | 6/1997 | Michael . | |
| 5,890,808 | 4/1999 | Neff et al. | 382/209 |
| 5,901,246 | 5/1999 | Hoffberg et al. | 382/209 |

FOREIGN PATENT DOCUMENTS

| | | | |
|---|---|---|---|
| 0142990A2 | 5/1985 | European Pat. Off. | G06F 15/70 |
| 2253697A | 9/1992 | United Kingdom | G01N 21/88 |

*Primary Examiner*—Vu Le
*Attorney, Agent, or Firm*—Brooks & Kushman P.C.

[57] ABSTRACT

A method and system are described for use at a machine vision station to correctly identify errors within a sample image of an object by means of a probability image where a value of each pixel of the probability image is a probability. The probability image is created from a mean template image and a standard deviation image, both of which are created from a plurality of reference images of the object. The probability image is processed to detect the errors in the sample image independent of the values of the pixels which make up the sample image. Two different techniques are described for creating the probability image utilizing mean template, sample and standard deviation pixel values.

12 Claims, 3 Drawing Sheets

METHOD AND SYSTEM FOR DETECTING ERRORS IN A SAMPLE IMAGE

TECHNICAL FIELD

This invention relates to methods and systems for detecting errors in a sample image and, in particular, to computerized methods and systems for detecting errors in a sample image.

BACKGROUND ART

Template comparison analysis is a very important machine vision algorithm, and has been extensively described both in the patent literature and in text books. Essentially the process uses machine vision techniques to determine areas of difference between a digitally stored version of a known good image of an is object, and an image of what is supposed to be an identical object often taken directly on the production line. Its primary purpose is to automatically identify a flawed or damaged product, by "recognizing" a blemish in a sample image.

The current methodology often generates a reference or mean template image by "averaging" the image information (i.e. reference images) from several known good objects in order to increase the signal-to-noise ratio. As the mean template image is obtained by combining the data on a per pixel basis, it is essential that the relative alignment of the object and the camera be kept rigorously consistent; else subsequent images must be adjusted for alignment prior to being added to the average image.

In order to minimize the effects of areas that are known to be noise prone, even after alignment, many systems also derive a standard deviation image (i.e., $\sigma$ image) or a variation image. These images essentially map the high variance regions of the template. The standard deviation image can be used to generate a mask image which flags areas of the sample image where it is unwise to undertake pixel comparison.

Once the reference or template image has been trained, it is used by undertaking a pixel aligned absolute subtraction between the template and the incoming sample image. In an ideal world, the pixels of the sample image would all be identical to those in the template image. However, in practice, even in areas where there has been no change, noise will ensure that the intensity levels of the template and the sample image will be slightly different. Areas containing a major blemish will result in a very large difference signal being generated. The absolute operator ensures that any difference signal is always positive, and the resulting error map can be treated exactly as an image. Areas of difference that occur within high variation regions indicated by a set mask image pixel are set to zero, and are consequently ignored.

The process of comparison simply undertakes the absolute subtraction between the mean image and the sample image, and the result is masked by a thresholded version of the standard deviation or variation image.

Referring now to FIG. 1, one technique of U.S. Pat. No. 5,640,200 initially creates a composite template image by statistically combining multiple instances of a "perfect" image. The resulting template consists of a mean image, together with a standard deviation image (i.e. $\sigma$ image). Naturally, the areas of most "rapid" rate of change within the template components (i.e. edges and regions of color change) provide most of the contribution to the standard deviation image, which can be used to form a mask of regions which, even on a good sample, are subject to the greatest variation, and, on hunting for flaws, can be given much less weight than areas that are subject to little change.

Once the template image has been fully trained, sample images taken from the production line can be compared with it. However, there is very little chance of the template and sample image exactly overlaying. In order to remove this misalignment some form of registration must be undertaken. This process invariably uses some form of correlation between either known landmarks or fiducial marks on both template and sample images, else using the complete image itself. Done properly, this process can provide a sub-pixel accurate measurement of the relative positioning of the template and the sample. This information can be used to either digitally re-register the images, or else can be used to re-position the sample image relative to the camera to ensure that the two images are optimally aligned.

Flaws between the template image and the sample image can then be detected by the simple process of undertaking an absolute subtraction of the two. Thus, any difference, irrespective of whether the intensity is brighter or darker than the other, results in a positive difference.

The value of this difference can either be thresholded, or else compared to the standard deviation image. Comparing with the a image allows one to determine if the difference in that region of the image is greater than that expected from the distribution derived from the template samples. If so, the pixel is marked as a flaw, or else it is considered as part of the natural statistical variation between acceptable samples. The resulting flaw flag can be directly used to provide an error image, which, after further analysis using morphological tools such as blob analysis, high-lights the position of any artifacts.

The system of the above-noted patent works well in many applications, and is used extensively. Although this technique is fairly rapid, it leaves a lot to be desired. For example, at what level does one threshold the deviation image to generate the mask image. Also, what level does one threshold the masked difference image to generate the error map. Too high a value and crucial errors will be missed, too low a value and minor differences due to noise will be included.

SUMMARY OF THE INVENTION

An object of the present invention is to provide a method and system for detecting errors in a sample image of an object utilizing a template comparison analysis having a probability image which is independent of the values (i.e. intensities) of the pixels in the sample image.

In carrying out the above object and other objects of the present invention, a method is provided for detecting errors in a sample image of an object. The sample image has a plurality of pixels having values. The method includes the steps of creating a plurality of reference images of the object and creating a mean template image of the object. The mean template image has a plurality pixels. Each pixel of the mean template image is a mean of a plurality of spatially corresponding pixels of the plurality of reference images. The method also includes the step of creating a standard deviation image of the object. The standard deviation image also has a plurality of pixels. Each pixel of the standard deviation image is a standard deviation of a plurality of spatially corresponding pixels of the plurality of reference images. Also, the method includes the step of creating a probability image of the object. The probability image also has a plurality of pixels. A value of each pixel of the probability image is a probability. A current probability of each of the pixels of the probability image is derived from a current value of spatially corresponding pixels of the mean template, standard deviation and sample images. The method further includes the step of processing the probability image to detect errors in the sample image independent of the values of the pixels in the sample image.

Preferably, the method further includes the steps of generating calibration data based on possible values for the pixels of the mean template, standard deviation and sample images, and storing the calibration data in the form of a pixel map at a plurality of locations. A current probability of each of the pixels of the probability image is stored at a location determined by current values of the spatially corresponding pixels of the mean template, standard deviation and sample images.

Also, preferably, the step of processing includes the step of thresholding the probability image to form an error map.

The probability image may be a bipolar probability image and the probabilities of the pixels of the bipolar probability image are signed probabilities. A sign of a probability of a pixel of the bipolar probability image is based on a difference between current values of spatially corresponding pixels of the mean template and sample images. The step of processing also includes the step of thresholding the bipolar probability image at a predetermined probability on both sides of a zero line to form an error map.

Further in carrying out the above object and other objects of the present invention, a system for detecting errors in a sample image of an object at a vision station is provided. The sample image has a plurality of pixels having values. The system includes an imager for creating a plurality of reference images of the object, and an image processor for creating a mean template image of the object. The mean template image has a plurality of pixels. Each pixel of the mean template image is the mean of a plurality of spatially corresponding pixels of the plurality of reference images. The image processor also creates a standard deviation image of the object. The standard deviation image also has a plurality of pixels. Each pixel of the standard deviation image is a standard deviation of the plurality of spatially corresponding pixels of the plurality of reference images. The image processor also creates a probability image of the object. The probability image has a plurality of pixels. A value of each pixel of the probability image is a probability. A current probability of each of the pixels of the probability image is derived from current values of spatially corresponding pixels of the mean template, standard deviation and sample images. The image processor further processes the probability image to detect the errors in the sample image independent of the values of the pixels in the sample image.

Preferably, the system includes means for generating calibration data based on possible values for the pixels of the mean template, standard deviation and sample images, and a memory for storing the calibration data at a plurality of locations in the form of a pixel map. A current probability of each of the pixels of the probability image is stored at a location determined by current values of spatially corresponding pixels of the mean template, standard deviation and sample images.

The image processor also preferably includes a thresholder for thresholding the probability image to form an error map.

The probability image may be a bipolar probability image wherein the probabilities of the plurality of pixels of the bipolar probability image are signed probabilities. A sign of a probability of a pixel of the bipolar probability image is based on a difference between a current value of spatially corresponding pixels of the mean template and sample images. The image processor then includes a thresholder for thresholding the bipolar probability image at a predetermined probability on both sides of a zero line to form an error map.

The above object and other objects, features and advantages of the present invention are readily apparent from the following detailed description of the best mode for carrying out the invention when taken in connection with the accompanying drawings.

BEST MODE FOR CARRYING OUT THE INVENTION

The method and system of the present invention are new approaches to template comparison analysis using "probability images" to thereby apply a statistical approach to the above-noted problems in the prior art.

Figure 1:
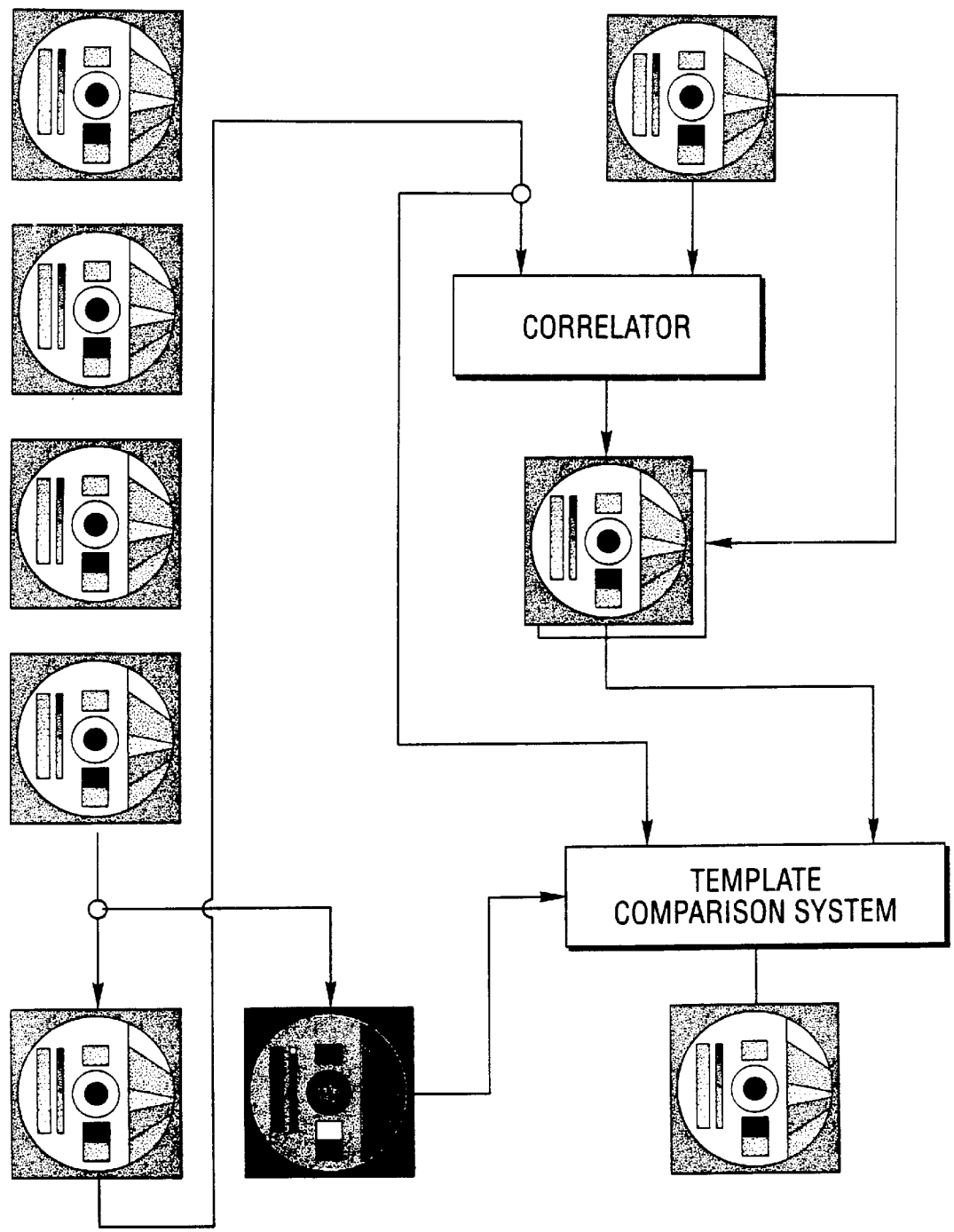
FIG. 1 is a schematic block diagram flow chart illustrating a prior art system for detecting errors and flaws in sample images.
Figure 2:
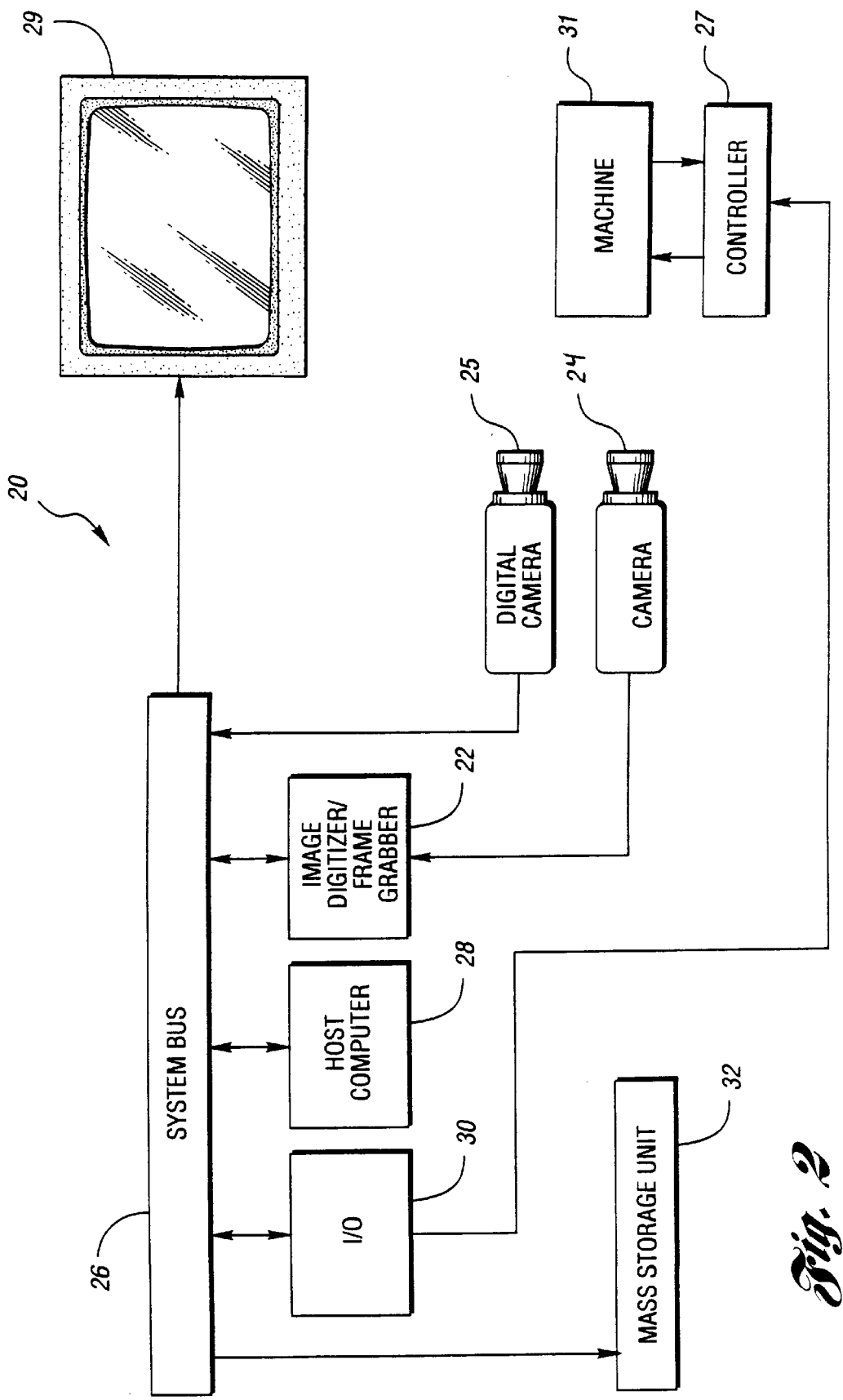
FIG. 2 is a schematic diagram illustrating a machine vision system and station at which the method and system of the present invention can automatically detect errors in a sample image.

Referring to the drawings Figures, there is illustrated schematically in FIG. 2 a machine vision system and station, generally indicated at 20, by which the method and system of the present invention can automatically detect errors in a sample image of an object. In general, errors in the sample image indicate incorrect intensity/color levels.

The machine vision system 20 typically includes an image digitizer/frame grabber 22. The image digitizer/frame grabber 22 samples and digitizes input images from an image source such as a camera 24 and places each input image into a frame buffer having picture elements. Each of the picture elements may consist of an 8-bit number representing the brightness of that spot in the image. The camera 24 may be an image source such as an analog, digital, or line scan camera such as RS-170, CCIR, NTSC and PAL. A digital camera 25 may be provided to eliminate the need for the image digitizer/frame grabber 22.

The system 20 also includes input/output circuits 30 to allow the system 20 to communicate with external devices such as a controller 27 for controlling a machine 31 associated with an object to be imaged.

A system bus 26 may be either a PCI, an EISA, ISA or VL system bus or any other standard bus to allow inter-system communication such as at a monitor 29 of the system 20.

The image digitizer/frame grabber 22 may be a conventional frame grabber board such as that manufactured by Matrox, Cognex, Data Translation or other frame grabbers. Alternatively, the image digitizer/frame grabber 22 may comprise a vision processor board such as made by Cognex.

The machine vision system 20 may be programmed at a mass storage unit 32 to include custom controls for image processing and image analysis. Examples of image processing may include linear and non-linear enhancement, morphology, color and image arithmetic. Also, image analysis may include search, edge, caliper, blob, template, color, 2-D and 3-D measurements.

A computer 28 of the system 20 may be a Pentium-based IBM compatible PC or other computer-based system having a sufficient amount of RAM and hard disk space for performing the algorithms associated with the present invention.

In order to explain the technique of the present invention, one needs to introduce an equation, which, at first sight would seem to preclude its use in real applications. However, as described hereinbelow, this can be accomplished with virtually zero computational overhead.

Figure 3:
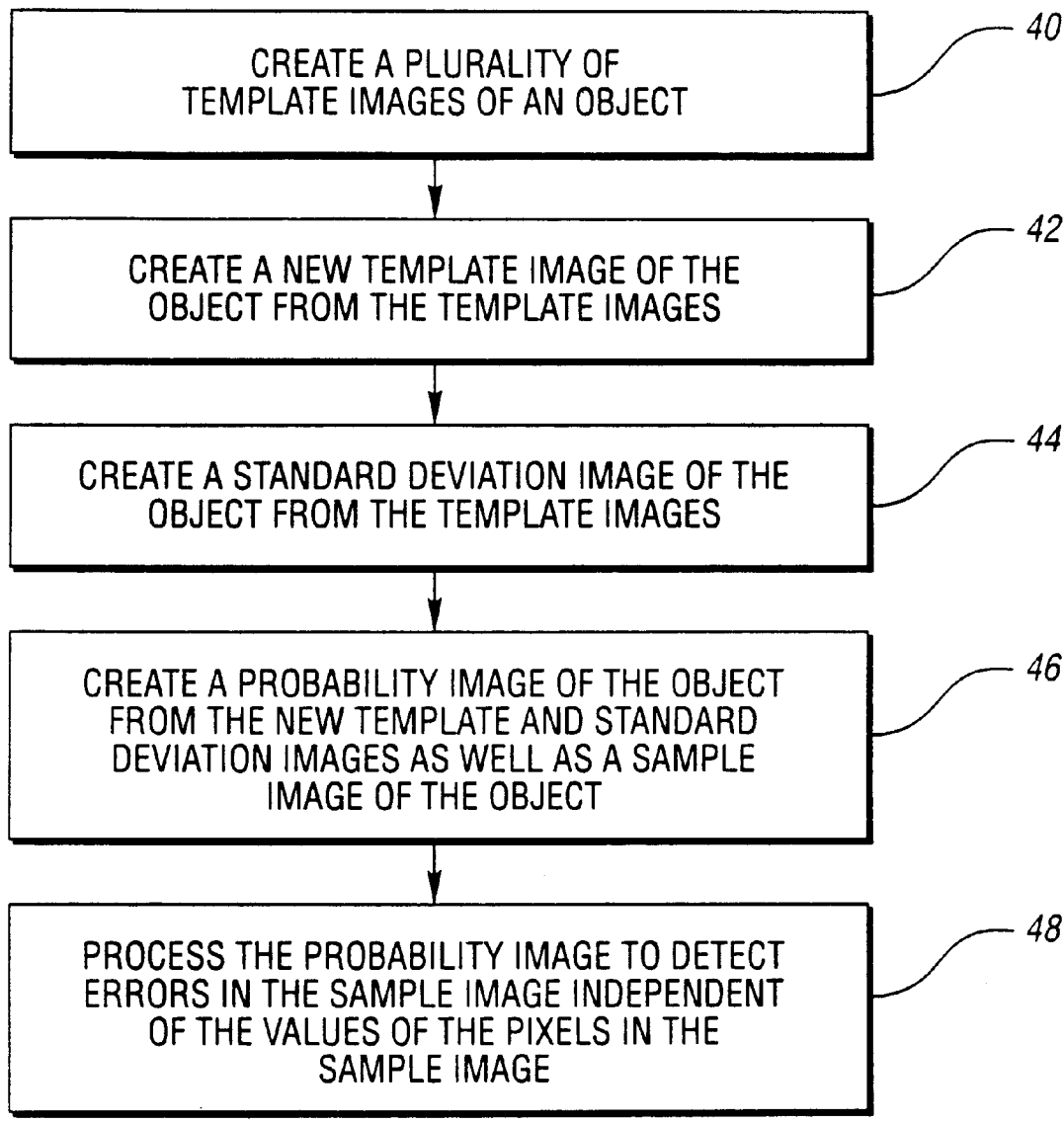
FIG. 3 is a block diagram flow chart illustrating the method of the present invention.

Training is exactly the same as before, as illustrated in FIG. 3. A number of acceptable specimens are imaged at block 40 and the mean and standard deviation images are created or computed, as indicated at blocks 42 and 44, respectively. Due to noise and sampling differences, each acceptable specimen is assumed to be a sample of a Gaussian distribution. Furthermore, each pixel can also be modeled as an acceptable sample of its own local Gaussian function. The mean of this function is simply the intensity of the mean or average image at that pixel position. Similarly, the amount of spread or uncertainty in a particular pixel is given simply by the intensity of the standard deviation image at the corresponding pixel position.

Modeled in this fashion, one can simply scan the sample image, and ask the question, "What is the probability of finding this particular pixel value at this position, if it belongs to the template distribution?" Specifying that an exact correspondence between the current sample pixel and the mean value corresponds to unity, one can compute the probability straight from the following equation:

$$\text{Probability} = e^{-\frac{(\text{Sample}-\mu)^2}{2*\sigma^2}}$$

It can be seen that this equation has some interesting properties. First, when the sample pixel equals the mean value ($\mu$), then the probability goes to 1. Also note that the $\sigma$ value in the denominator of the negative exponent means that as this gets bigger, the sample pixel value must drift much further away from the mean value to reach a given probability level. This means that the equation automatically compensates for regions of high variance—there is no need to include a masking operation.

In practice, one is looking for faults in the sample image, so instead of calculating the probability of the sample pixel belonging to the template distribution, one simply subtracts this value from 1 and generate the probability that it does not belong to that distribution. This value can then be simply scaled, and used as an intensity value in the formation of a probability image, as indicated at block 46 in FIG. 3.

The background of a probability image typically appears to be considerably more noisy than the straight forward difference technique. However, this is to be expected. The imaging process is subject to noise. Consequently, each pixel will differ from its corresponding point on another image, and so in fairly low standard deviation regions of the image, this difference will show up as a dirty snow texture. In regions of transition where the standard deviation is very high, the system is able to withstand considerable variation between sample and template. This is to be compared to the raw difference image in the prior art, where these edges dominate the difference image. The areas of difference stand out like a sore thumb. Many errors are real, and not just artifacts of probability processing and are easily detected in the probability plane, but are virtually impossible to see in the prior art simple subtraction process.

This effect is relatively easily understood when one considers the brightest intensity that one can get in a difference image determined by the intensity of the maximum of the sample and template pixels. Thus, in dark areas of the image, one can only expect small differences, and hence dim pixels.

Compare this with the probability image, where (at least theoretically) zero probability of the two pixels being different returns black and wherein unity probability of it being different returns white—irrespective of the intensities of the original pixels. Detecting errors in the probability plane is effectively intensity independent with the method and system of the present invention.

Thresholding to form the error map becomes far more deterministic, as illustrated at block 48. If one wants to select all points that you are 80% certain are errors, then one simply sets the threshold level to 255*80/100=204.

Bipolar Probability Processing

This section briefly describes a simple extension of the techniques described above, in which considerable "hidden detail" can be enhanced and made visible. Dr. Chris Sanby originally pioneered the application of bipolar image processing in difference images as discussed herein.

The essence of this technique is to notice that probability is always a unipolar signal. It is zero where the pixel in the sample image exactly equals the template intensity, and increases the further that pixel value moves from the mean value—irrespective of the direction of the error.

Consider the situation where one has a uniform template intensity, and a sample which has two zones, the first is slightly brighter than the template, and the second is slightly darker, by exactly the same amount. The resulting probability image will be a uniform field.

Although the probability image is perfectly correct, in as much as the assumed Gaussian distribution is symmetrical, the probability is indeed the same for the two parts of the sample image. In doing this, one has possibly lost some important spatial information regarding the distribution of errors. This of course may well be irrelevant, a flaw in the image is a flaw whichever way it goes.

If, however, this spatial information may be important, one can introduce a mechanism that can carry this spatial information into the probability plane (albeit at a small computational overhead).

One simply assigns the sign of the difference between the template and sample pixel to the probability. Now any value of a sample that is smaller than the template is given a negative probability and any that is larger than the template is given a positive probability.

It should be emphasized that mathematically a negative probability is completely meaningless. It is simply used to flag whether the difference is positive or negative.

In order to generate an error map, image thresholding is done at the same value but on both sides of the zero line. Displaying the probability image is achieved by simply halving its amplitude and offsetting all values by half full scale. Now a perfect match is mapped to mid grey, not black. Darker levels are areas where the sample template difference is negative, and brighter areas are where it is positive.

A large bright patch on the probability image will map to a dark region on the offset bipolar image if the sample image is darker than the template. Streaking on the disc which is not obvious on the probability image may become unmistakable on the bipolar image. An illumination gradient in the image will have no effect on probability images, whereas it would have a significant effect on a standard difference image.

Probability Images and Color

The probability images previously described have been monochrome. The basic reason for this is that in many applications, no information is needed in identifying which color plane the flaw exists on. This, however, does not mean that the information is not there. It simply means that up to now we do not need it. Indeed, the way that the monochrome images are generated comes from combining the information obtained from the three color channels of the color camera 24. Instead of combining them, the probabilities for each color can be used as the color plane itself, resulting in stunning images.

A magenta tinge to a dark region may indicate that although all colors were missing in this region, green is selectively lower. Similarly, a green tinge in a bright side indicates there is a slight preponderance of green. This effect probably has more to do with the color balance of the camera 24 than anything to do with the illumination and optics of the imaging system.

Rapid Computation of Probability Images

Irrespective of how much information probability images can provide, they are of little use if they cannot be computed rapidly. Clearly, the complex equation needed to compute the value of probability noted above does not lend itself to fast computation; especially considering many of the functions would need to be computed in floating point arithmetic, thus precluding the use of MMX code to increase the computation throughput. However, all is not lost in the sense that one knows that all of the data that goes into the algorithm is essentially unsigned 8 bit pixels. These data being:

Template pixel value;
Sample Pixel value; and
Standard deviation pixel value.

Similarly, one knows that the data coming out of the algorithm is also a (possibly signed) 8 bit number. It is therefore possible to construct a precalculated pixel map which will undertake the computation in a single memory access time. This can be accomplished in at least one of two ways.

The first is to allocate a 16 Mbyte slab of memory in the system 26. At system startup or some equally convenient time, an exhaustive computation is undertaken for every possible value of template intensity, sample intensity and standard deviation intensity. The result of this computation is placed in the memory block at the location defined by the concatenation of the three 8 bit input parameters listed above. Although this computation will take 16 million loops—floating point arithmetic, it only has to be undertaken once. After that, the results can be stored on disc, and uploaded on system initialization. In use, the current value of the template pixel, sample pixel and the standard deviation pixel are concatenated, and used as an address to the programmed pixel map, the result of this memory access is the required probability value.

The second way is slightly less efficient at runtime, but reduces the required memory for the pixel map down to a more realistic 64K. This reduction of 256 is achieved by reducing the input address range from 24 bits to 16 bits by the process of using a combination of the standard deviation pixel intensity together with the difference between the template and sample pixel intensity. For straight forward probability images, absolute difference between the template and sample pixel intensity is concatenated with the standard deviation intensity to form the 16 bit address.

For offset bipolar probability the difference between half the template and half the sample pixel intensity is concatenated with the standard deviation intensity to form the 16 bit address. Initialization is undertaken in exactly the same fashion as described for the 16 Mbyte system; an exhaustive computation is undertaken for every possible value of difference between the template intensity and sample intensity with the standard deviation intensity.

While the best mode for carrying out the invention has been described in detail, those familiar with the art to which this invention relates will recognize various alternative designs and embodiments for practicing the invention as defined by the following claims.

What is claimed is:

1. A method for detecting errors in a sample image of an object, the sample image having a plurality of pixels having values, the method comprising the steps of:

creating a plurality of reference images of the object;

creating a mean template image of the object, the mean template image having a plurality pixels, each pixel of the mean template image being a mean of a plurality of spatially corresponding pixels of the plurality of reference images;

creating a standard deviation image of the object, the standard deviation image also having a plurality of pixels, each pixel of the standard deviation image being a standard deviation of a plurality of spatially corresponding pixels of the plurality of reference images;

creating a probability image of the object, the probability image also having a plurality of pixels, a value of each pixel of the probability image being a probability, a current probability of each of the pixels of the probability image being derived from a current value of spatially corresponding pixels of the mean template, standard deviation and sample images; and processing the probability image to detect errors in the sample image independent of the values of the pixels in the sample image.

2. The method as claimed in claim 1 further comprising the steps of:

generating calibration data based on possible values for the pixels of the mean template, standard deviation and sample images; and storing the calibration data in the form of a pixel map at a plurality of locations, a current probability of each of the pixels of the probability image being stored at a location determined by current values of the spatially corresponding pixels of the mean template, standard deviation and sample images.

3. The method as claimed in claim 1 wherein the step of processing includes the step of thresholding the probability image to form an error map.

4. The method as claimed in claim 1 wherein the probability image is a bipolar probability image and wherein probabilities of the pixels of the bipolar probability image are signed probabilities.

5. The method as claimed in claim 4 wherein a sign of a probability of a pixel of the bipolar probability image is based on a difference between current values of spatially corresponding pixels of the mean template and sample images.

6. The method as claimed in claim 5 wherein the step of processing includes the step of thresholding the bipolar probability image at a predetermined probability on both sides of a zero line to form an error map.

7. A system for detecting errors in a sample image of an object at a vision station, the sample image having a plurality of pixels having values, the system comprising:
- an imager for creating a plurality of reference images of the object; and
- an image processor for:
  - creating a mean template image of the object, the mean template image having a plurality of pixels, each pixel of the mean template image being a mean of a plurality of spatially corresponding pixels of the plurality of reference images;
  - creating a standard deviation image of the object, the standard deviation image also having a plurality of pixels, each pixel of the standard deviation image being a standard deviation of the plurality of spatially corresponding pixels of the plurality of reference images;
  - creating a probability image of the object, the probability image also having a plurality of pixels, a value of each pixel of the probability image being a probability, a current probability of each of the pixels of the probability image being derived from current values of spatially corresponding pixels of the mean template, standard deviation and sample images; and
  - processing the probability image to detect the errors in the sample image independent of the values of the pixels in the sample image.

8. The system as claimed in claim 7 further comprising:
- means for generating calibration data based on possible values for the pixels of the mean template, standard deviation and sample images; and
- a memory for storing the calibration data at a plurality of locations in the form of a pixel map, a current probability of each of the pixels of the probability image being stored at a location determined by current values of spatially corresponding pixels of the mean template, standard deviation and sample images.

9. The system as claimed in claim 7 wherein the image processor includes a thresholder for thresholding the probability image to form an error map.

10. The system as claimed in claim 7 wherein the probability image is a bipolar probability image and wherein probabilities of the plurality of pixels of the bipolar probability image are signed probabilities.

11. The system as claimed in claim 10 wherein a sign of a probability of a pixel of the bipolar probability image is based on a difference between a current value of spatially corresponding pixels of the mean template and sample images.

12. The system as claimed in claim 11 wherein the image processor includes a thresholder for thresholding the bipolar probability image at a predetermined probability on both sides of a zero line to form an error map.

* * * * *